United States Patent
Eldeeb et al.

(10) Patent No.: US 12,459,376 B2
(45) Date of Patent: Nov. 4, 2025

(54) OPTIMIZATION OF SWITCHING FREQUENCY AND PULSE WIDTH MODULATION TECHNIQUE FOR TRACTION POWER INVERTERS

(71) Applicant: BorgWarner Inc., Auburn Hills, MI (US)

(72) Inventors: Hassan H. Eldeeb, Carmel, IN (US); Ujjwal Kumar, Rochester Hills, MI (US); Ronald J. Krefta, Noblesville, IN (US); Caleb W. Secrest, Noblesville, IN (US)

(73) Assignee: BorgWarner Inc., Auburn Hills, MI (US)

( * ) Notice: Subject to any disclaimer, the term of this patent is extended or adjusted under 35 U.S.C. 154(b) by 168 days.

(21) Appl. No.: 18/376,599

(22) Filed: Oct. 4, 2023

(65) Prior Publication Data
US 2025/0115139 A1    Apr. 10, 2025

(51) Int. Cl.
| | |
|---|---|
| *H02P 6/08* | (2016.01) |
| *B60L 15/04* | (2006.01) |
| *B60L 15/20* | (2006.01) |
| *H02M 1/00* | (2006.01) |
| *H02M 7/5395* | (2006.01) |

(52) U.S. Cl.
CPC ........... *B60L 15/2045* (2013.01); *B60L 15/04* (2013.01); *B60L 15/2009* (2013.01); *B60L 15/2072* (2013.01); *H02M 1/0058* (2021.05); *H02M 7/5395* (2013.01); *B60L 2210/42* (2013.01); *B60L 2240/423* (2013.01)

(58) Field of Classification Search
CPC .. B60L 15/04; B60L 15/2009; B60L 15/2072; B60L 2210/42; B60L 2240/423; B60L 2240/421; H02M 1/0058; H02M 7/5395
See application file for complete search history.

(56) References Cited

U.S. PATENT DOCUMENTS

| | | | |
|---|---|---|---|
| 2009/0107742 A1* | 4/2009 | Schulz | B60K 6/52 180/65.7 |
| 2021/0354566 A1* | 11/2021 | Ben-Ari | B60T 1/10 |
| 2022/0255488 A1* | 8/2022 | Mantzanas | H02P 27/085 |
| 2023/0031958 A1* | 2/2023 | Breese | B60L 15/007 |
| 2023/0198439 A1* | 6/2023 | Alvi | H02P 21/05 318/400.02 |

OTHER PUBLICATIONS

Hava, Ahmet, et al.; Simple Analytical and Graphical Methods for Carrier-Based PWM-VSI Drives; IEEE Transactions on Power Electronics; vol. 14, No. 1; Jan. 1999 (13 pages).

(Continued)

*Primary Examiner* — Muhammad S Islam
(74) *Attorney, Agent, or Firm* — Reising Ethington P.C.

(57) ABSTRACT

A method of operating a power inverter for an electric machine includes selecting an inverter switching technique; determining a frequency range for inverter switching; determining a direct current (DC) voltage range for inverter switching; determining an optimal switching map including an inverter switching technique and frequency selection for each value of torque-speed on a torque-speed curve; and controlling switches included in the power inverter using the optimal switching map.

16 Claims, 5 Drawing Sheets

(56) References Cited

OTHER PUBLICATIONS

Amornwongpeeti, Sarayut, et al.; A Combined MTPA and Maximum Efficiency Control Strategy for IPMSM Motor Drive Systems; 2016 (6 pages).
Gallert, Brian, et al.; Maximum Efficiency Control Strategy of PM Traction Machine Drives in GM Hybrid and Electric Vehicles; 2017 (6 pages).
Rettner, Cornelius, et al.; Voltage Ripple Analysis Based on DC-Link Current Harmonics for Voltage Source Inverters; 2019 (6 pages).
Chang, Le, et al.; Efficiency Optimization of PWM-Induced Power Losses in Traction Drive Systems with IPM Machiens Using Wide Bandgap-Based Inverters; IEE Transactions on Industry Applications; vol. 58, No. 5; Sep./Oct. 2022 (15 pages).

\* cited by examiner

OPTIMIZATION OF SWITCHING FREQUENCY AND PULSE WIDTH MODULATION TECHNIQUE FOR TRACTION POWER INVERTERS

TECHNICAL FIELD

The present application relates to control systems and, more particularly, to control systems used with electric machines.

BACKGROUND

Vehicles increasingly rely on one or more electric machines for all or at least some vehicle propulsion. Electric vehicles (EVs) typically include a vehicle battery, an electric machine (sometimes referred to as a rotating electric machine), a power inverter, and a control system that selectively supplies electrical energy stored in the vehicle battery to the electric machine through the power inverter. The power inverter can receive direct current (DC) current from the vehicle battery and invert it into alternating current (AC) current to supply the electric machine. The power inverter can be controlled using a control system implementing a switching program that may maximize efficiency during some operating conditions but during other operating conditions the program may operate relatively inefficiently. It would be helpful to implement a flexible control system for the power inverter that optimizes the efficiency of the electric machine depending on the operating conditions.

SUMMARY

In one implementation, a method of operating a power inverter for an electric machine includes selecting an inverter switching technique; determining a frequency range for inverter switching; determining a direct current (DC) voltage range for inverter switching; determining an optimal switching map including an inverter switching technique and frequency selection for each value of torque-speed on a torque-speed curve; and controlling switches included in the inverter using the optimal switching map.

In another implementation, a method of operating a power inverter for an electric machine includes selecting an inverter switching technique; determining a frequency range for inverter switching; determining a direct current (DC) voltage range for inverter switching; measuring performance of the electric machine at a selected inverter switching technique and a determined frequency range; determining an optimal switching map including an inverter switching technique and frequency selection for each value of torque-speed on a torque-speed curve based on the measured performance; and controlling switches included in the power inverter using the optimal switching map.

In yet another implementation, a power inverter for controlling an electric machine includes a control system configured to select an inverter switching technique; determine a frequency range for inverter switching; determine a direct current (DC) voltage range for inverter switching; determine an optimal switching map including an inverter switching technique and frequency selection for each value of torque-speed on a torque-speed curve; and control switches included in the inverter that are configured to electrically connect to the electric machine and the battery using the optimal switching map.

DETAILED DESCRIPTION

A control system controls a power inverter that inverts DC electrical voltage provided by a vehicle battery into AC electrical current supplied to an electric machine or rotating electric machine. The control system selects a particular pulse-width modulation (PWM) switching technique and switching frequency for each operational point on a Feasible Torque-Speed (T–ω) curve for a drive system based on system limitations. For each torque-speed (T·ω) value the electric machine can attain over a DC voltage range, an optimal PWM switching technique can be selected and a switching frequency at which the power inverter is operated can be selected as well. The optimal PWM switching technique and switching frequency for each torque-speed (T–ω) value can be determined by the control system and stored, to be accessed and used during operation of the electric machine. In this way, the control system can be combined with an electric machine without a priori knowledge of the technical specifications or characteristics of the motor or the environment where the three-phase AC motor is installed. After the control system and the electric machine are combined, the control system can execute a process so that it determines the optimal PWM switching technique and switching frequency for each torque-speed (T–ω) value based on the voltage range of the motor and the torque-speed (T–ω) curve. In addition, the control system can select an economy mode or a performance mode, depending on what the operator values. The control system can reduce a power inverter's power losses and ripple in AC electric current supplied to the electric machine.

Figure 1:
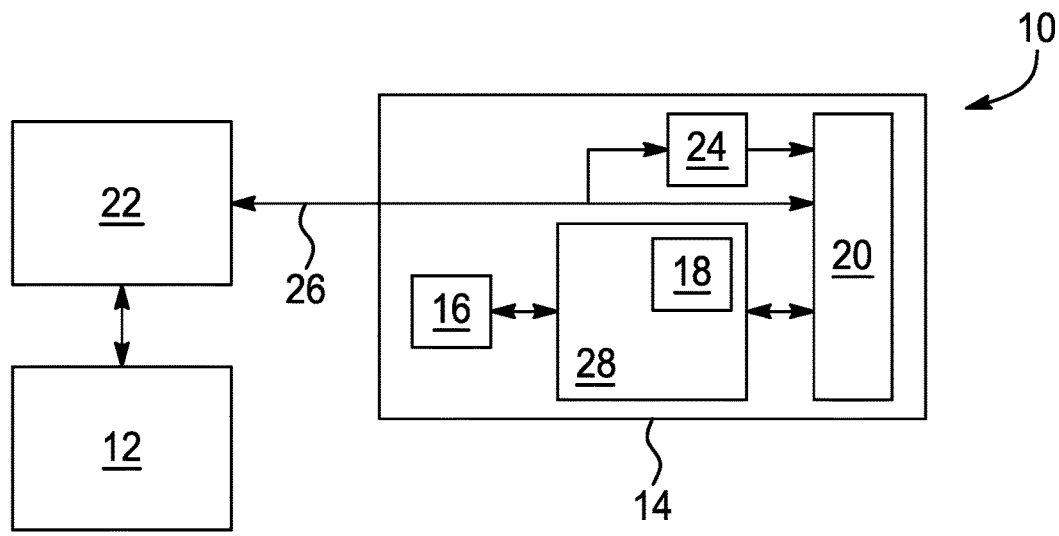
FIG. 1 is a block diagram depicting an implementation of a battery electric vehicle (BEV), including a control system.

Turning to FIG. 1, an implementation of an electrical system 10 is shown including an electrical grid 12 and a battery electric vehicle (BEV) 14 that can either receive electrical power from or provide electrical power to the grid 12. While the control system and method of operating the control system is described with respect to a BEV, the method/system can be used in other environments. The electrical grid 12 can include any one of a number of electrical power generators and electrical delivery mechanisms. Electrical generators (not shown) create AC electrical power that can then be transmitted a significant distance away from the electrical generator for residential and commercial use. The electrical generator can couple with the electrical grid 12 that transmits the AC electrical power from the electrical generator to an end user, such as a residence or business. As the AC electrical power is provided to the electrical grid 12, the electrical power can exist at a relatively high voltage to transmit relatively long distances. Once the electrical power reaches a location where it is intended to be used, electrical transformers (not shown) can be used to reduce the voltage level before ultimately being provided to a residence or business.

The BEV 14 can include one or more electric machines 16 also called rotating electrical machines, that wholly, or at least partially, propel the vehicle. In the described implementation, the electric machine 16 is a permanent magnet motor, but other implementations are possible using the control system and functionality described herein. A three-phase power inverter 18 can be electrically coupled to a BEV battery 20 and the electric machine 16. The power inverter can receive DC electrical voltage from the BEV battery 20 and invert the DC electrical power into three-phase AC electrical current before supplying the AC electrical current to the electric machine 16. The power inverter 18 can be implemented in a variety of ways. For example, the power inverter 18 can include six MOSFETs that are selectively rendered conductive or turned on and off via gates that are in electrical communication with a control system or controller. The voltage supplied by the BEV battery 20 to the electric machine 16 can vary by application. The term "battery electric vehicle" or "BEV" can refer to vehicles that are propelled, either wholly or partially, by electric machines. BEV can refer to electric vehicles, plug-in electric vehicles, hybrid-electric vehicles, and battery-powered vehicles.

A BEV charging station, also referred to as a DC fast charger 22, can receive AC electrical power from the grid 12, rectify the AC electrical voltage into DC electrical power, and provide the DC electrical power to the BEV 14. The DC fast charger 22 can be geographically fixed, such as a charging station located in a vehicle garage or in a vehicle parking lot. The DC fast charger 22 can include an input terminal that receives the AC electrical power from the grid 12 and communicates the AC electrical power to the BEV battery 20 directly, bypassing an on-board vehicle battery charger 24 included on the BEV 14. An electrical cable 26 can detachably connect with an electrical receptacle on the BEV 14 and electrically link the DC fast charger 22 with the BEV 14 so that DC electrical power can be communicated between the DC fast charger 22 and the BEV battery 20. One type of DC fast charging may be referred to as Level 3 BEV charging, considered to be 60-350 kW. However, other charging standards and power levels are possible with the structure and functionality disclosed here. The BEV battery 20 can supply DC electrical power controlled by power electronics to the electric machine 16 that propels the BEV 14. The BEV battery 20 or batteries are rechargeable. Examples of the battery include lead-acid batteries, nickel-cadmium (NiCd), nickel metal hydride, lithium-ion, and lithium polymer batteries. However, battery technology is evolving and other chemistries and/or voltages may be used. A typical range of vehicle battery voltages can range from 100 to 1000V of DC electrical power (VDC). A control system 28, also called a controller, implemented as computer-readable instructions executable by a microprocessor, can be stored in non-volatile memory and called on to monitor current sensors and generate control signals that include gate signals for the power inverter 18. This will be discussed in more detail below.

Figure 2:
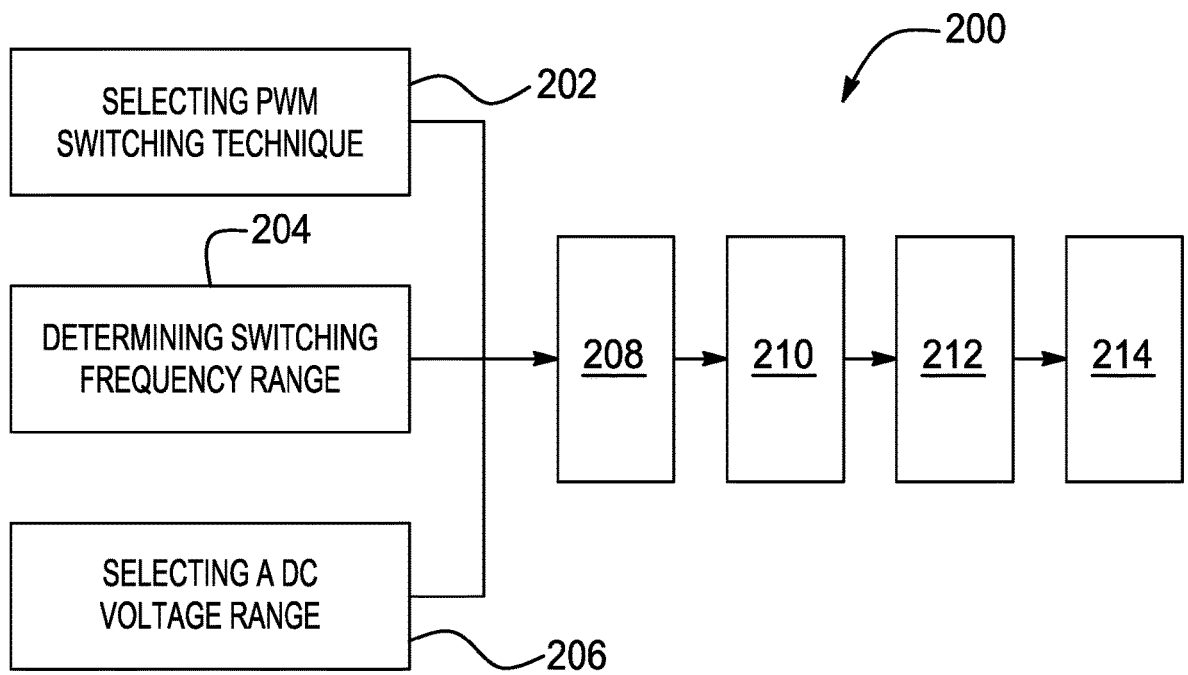
FIG. 2 is a block diagram depicting an implementation of a control system capable of controlling an electric machine.

Turning to FIG. 2, a method 200 of controlling the power inverter 18 electrically connected to the electric machine 16 is shown. The method 200 can be implemented using the control system 28 and includes selecting a particular pulse-width modulation (PWM) switching technique at block 202, determining a switching frequency range at block 204, and selecting a DC voltage range at block 206. The output from blocks 202-206 can be used at a performance measurement analysis block 208 to analyze the electric machine 16 using different PWM switching techniques and different frequency values within the frequency range at voltage values within the voltage range. The power losses of the power inverter 18 can be determined at each torque-speed (T–ω) value along an operational torque-speed (T–ω) curve at each possible switching frequency based on each selected PWM switching technique. It is also possible to determine the DC voltage ripples and AC current ripples.

A number of PWM switching techniques exist from which one can be selected at block 202. For example, such switching techniques include space vector pulse width modulation (SVPWM), discontinuous pulse width modulation (DPWM), third-order harmonic injected sinusoidal pulse width modulation (THIPWM), and generalized discontinuous pulse width modulation (GDPWM), to name a few different types of PWM switching techniques. It should be understood that other PWM switching techniques not expressly stated here are possible. Given a selected switching technique at block 202, such as SVPWM, a particular switching frequency range ($f_s=[f_{min}:f_{max}]$) can be determined at block 204. At block 206, a DC voltage range ($[V_{DCmin}:V_{Dcmax}]$) can be selected. For instance, SVPWM can be selected, a switching frequency between 2-16 kHz can be selected, and a voltage range of 700 V (−350V to +350V) can be selected at block 206.

Given these selections, the method 200 proceeds to block 208 where electric machine performance measurement can be carried out. This is shown in more detail in FIG. 3. At block 208, for each torque-speed (T–ω) point along the torque-speed (T–ω) curve, the method 200 can determine conduction power loss for the power inverter 18, switching power loss for the power inverter 18, total power loss for the power inverter 18, DC voltage ripple, AC current ripple, and/or switch temperature of a MOSFET. The results can be provided to a torque-speed (T–ω) map comprising a data table for every torque-speed (T–ω) point on the torque-speed (T–ω) curve. Each point can be associated with the determined power losses and voltage/current ripple. The steps detailed with respect to blocks 202-206 can be repeated for different selected PWM switching techniques (PWM 1, PWM 2, . . . PWM x) while holding the switching frequency and voltage ranges fixed. The power losses and current/voltage ripples can be determined using each switching technique. The method 200 proceeds to step 210.

The method 200 can generate an optimal switching map for the power inverter 18 at block 210 using the output of block 208. The optimal switching map can include each torque-speed (T–ω) point along the torque-speed (T–ω) curve such that at that point an optimal PWM switching technique and optimal switching frequency is specified. As part of creating the optimal switching map, the control system 28 can, for a specified voltage range ($[V_{DCmin}:V_{DCmax}]$) that is within peak-to-peak DC voltage ripples limits ($|V_{DC}$ pk−pk$|\leq V_{lim}$) and a pulse ratio greater than or equal to a pulse ratio limit ($PR_{limit}$), identify a switching frequency ($f_s$) that results in a minimum value of power inverter loss ($P_{loss}$). The switching frequency that minimizes loss at each torque-speed (T-ω) value can be stored in memory. This can be repeated for other PWM switching techniques (PWM 1, PWM 2, . . . , PWM x). The control system 28 can repeat the search for a switching frequency ($f_s$) that results in a minimum value of power inverter power losses ($P_{loss}$) over a plurality of other PWM switching techniques to select the switching technique and switching frequency at each torque-speed (T-ω) value on the torque speed curve that minimizes power inverter loss ($P_{loss}$) and/or minimizes AC current ripple (IAC).

Figure 3:
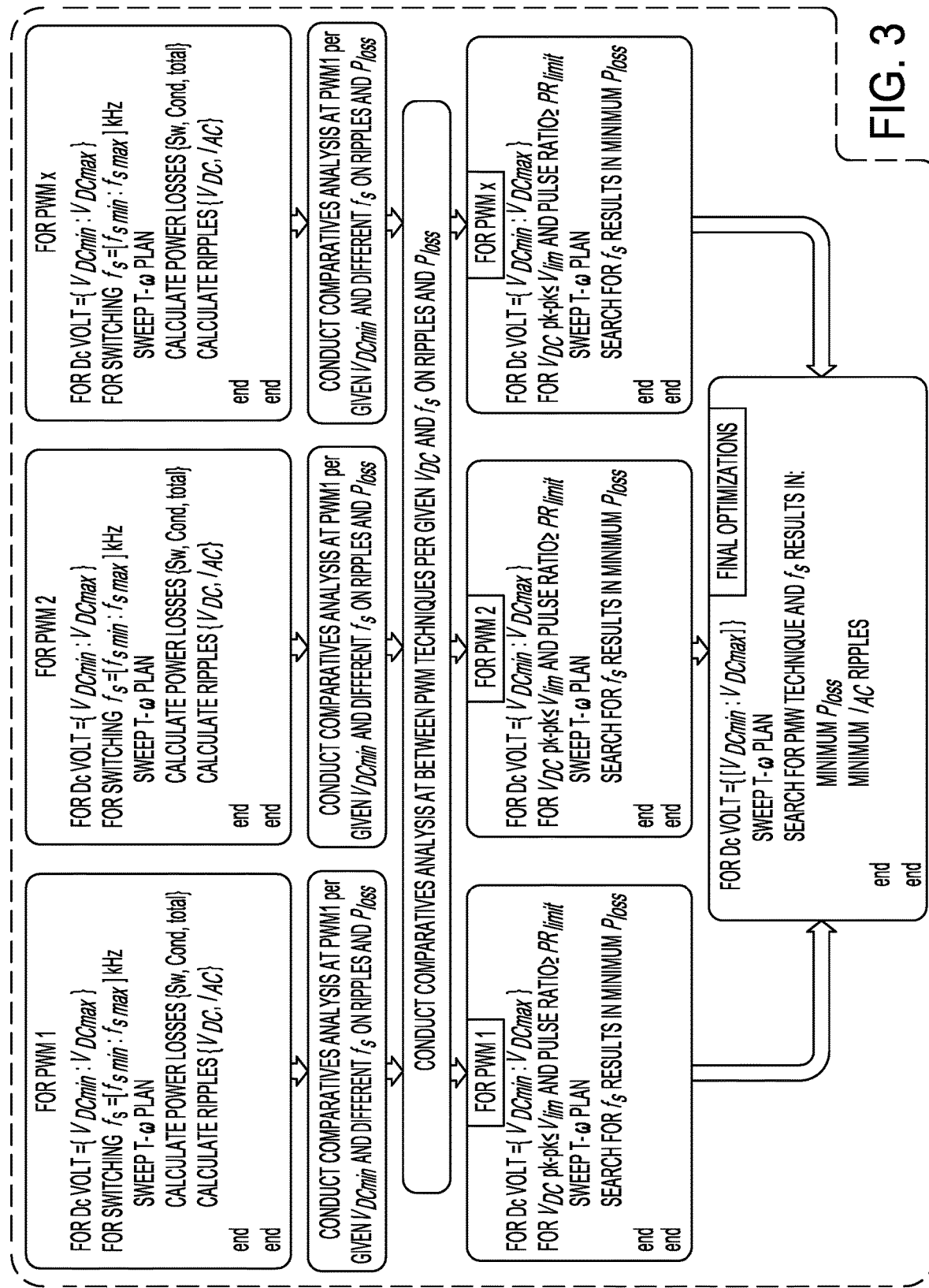
FIG. 3 is a block diagram depicting a portion of an implementation of a control system capable of controlling an electric machine.
Figure 4:
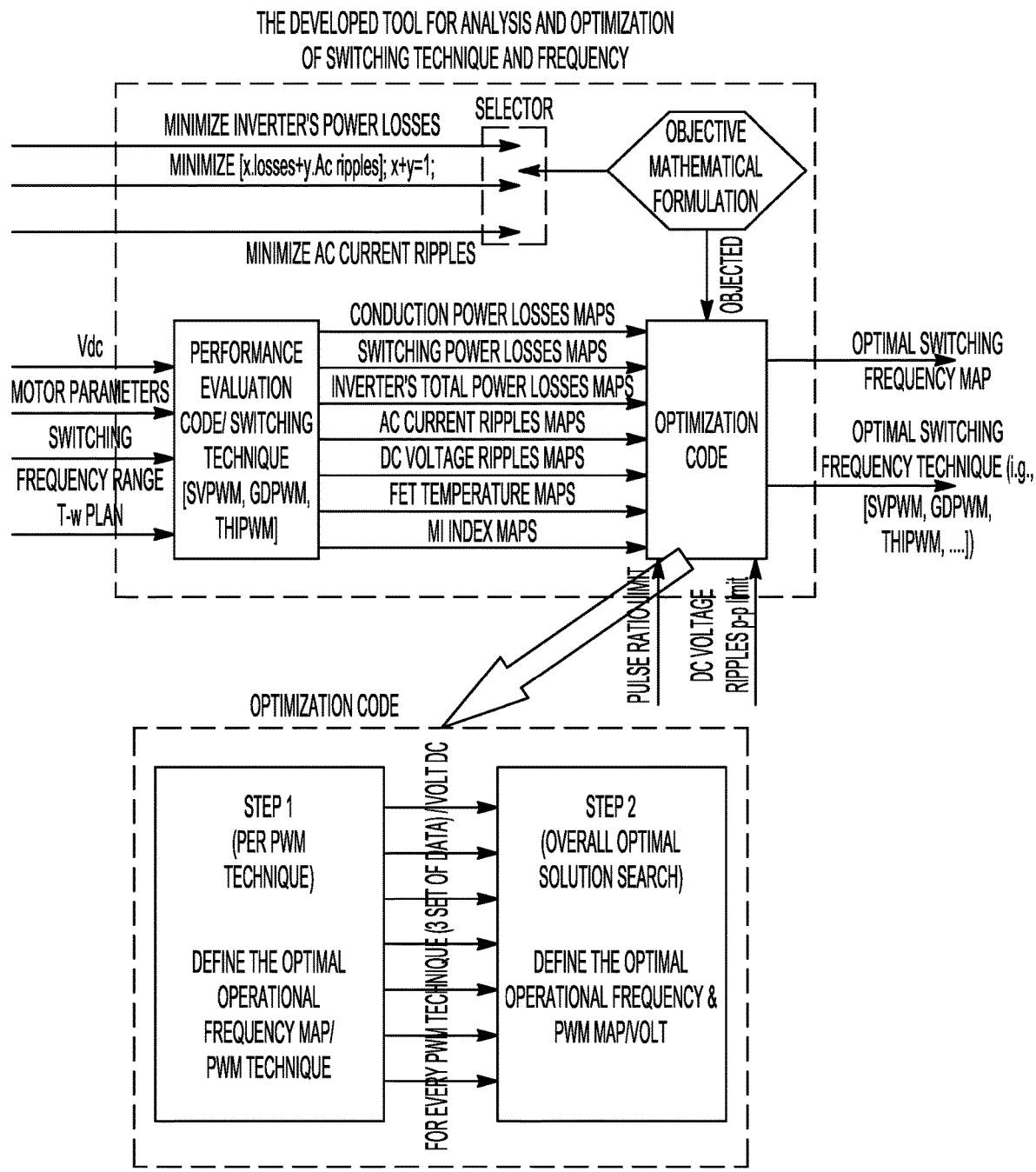
FIG. 4 is another block diagram depicting a portion of an implementation of a control system capable of controlling an electric machine.

The method 200 can include other steps to determine the optimal switching map, including the selected switching technique and switching frequency at each torque speed (T-ω) location along the torque-speed (T-ω) map. For example, at block 212, the control system 28 can access a setting that indicates whether maximum efficiency or maximum performance is preferred. At step 214, additional variables such as a voltage ripple limit and/or a pulse ratio limit can be considered. The method 200 then ends. An implementation of the method is shown in FIG. 3.

Figure 7:
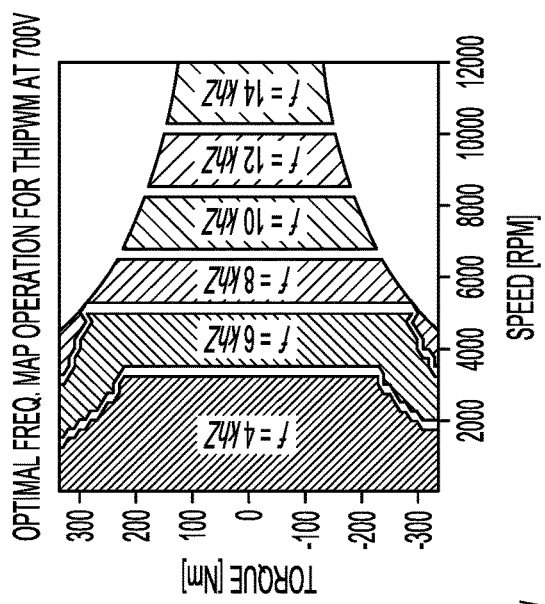
FIG. 7 is a graphical chart depicting an implementation of an optimal switching frequency map used by the control system for controlling an electric machine.
Figure 6:
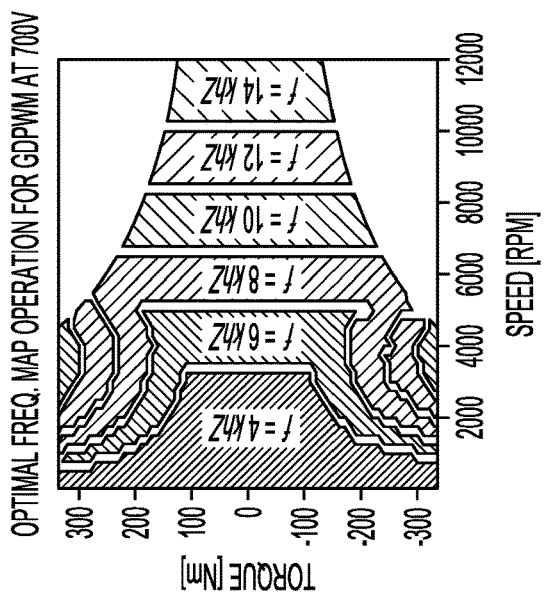
FIG. 6 is a graphical chart depicting an implementation of an optimal switching frequency map used by the control system for controlling an electric machine.
Figure 5:
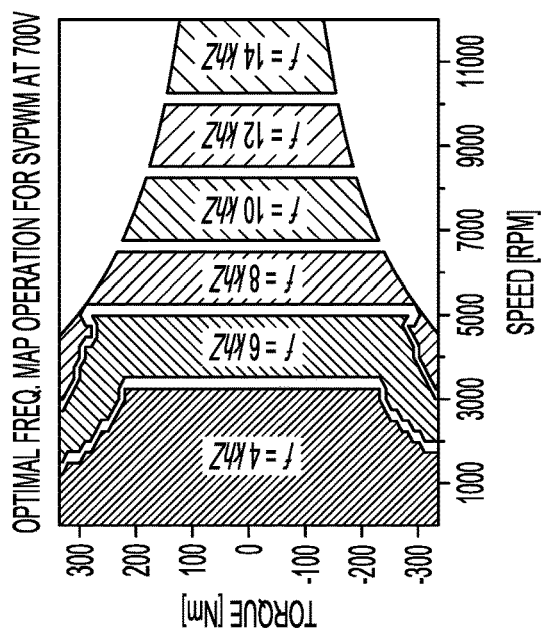
FIG. 5 is a graphical chart depicting an implementation of an optimal switching frequency map used by the control system for controlling an electric machine.

During operation of the electric machine 16, the control system 28 can receive input indicating a desired operational torque-speed input for the electric machine 16, and select a PWM switching technique and switching frequency for that input based on a stored optimal switching map. It is possible to store the optimal switching map in memory at the BEV 14. Graphical representations of optimal switching maps including a torque-speed (T-ω) curve resulting from the output of block 210 are shown in FIGS. 4-8. FIG. 5 depicts a stored optimal switching map depicting the torque (T) and angular speed (ω) at which the control system 28 selects a switching frequency of 4 kHz, 6 kHz, 8 kHz, 10 kHz, 12 kHz, or 14 kHz using SVPWM at 700V. FIG. 6 depicts a stored optimal switching map depicting the torque (T) and angular speed (ω) at which the control system 28 selects a switching frequency of 4 kHz, 6 kHz, 8 kHz, 10 kHz, 12 kHz, or 14 kHz using GDPWM at 700V. FIG. 7 depicts a stored optimal switching map depicting the torque (T) and angular speed (ω) at which the control system 28 selects a switching frequency of 4 kHz, 6 kHz, 8 kHz, 10 kHz, 12 kHz, or 14 kHz using THIPWM at 700V.

Figure 9:
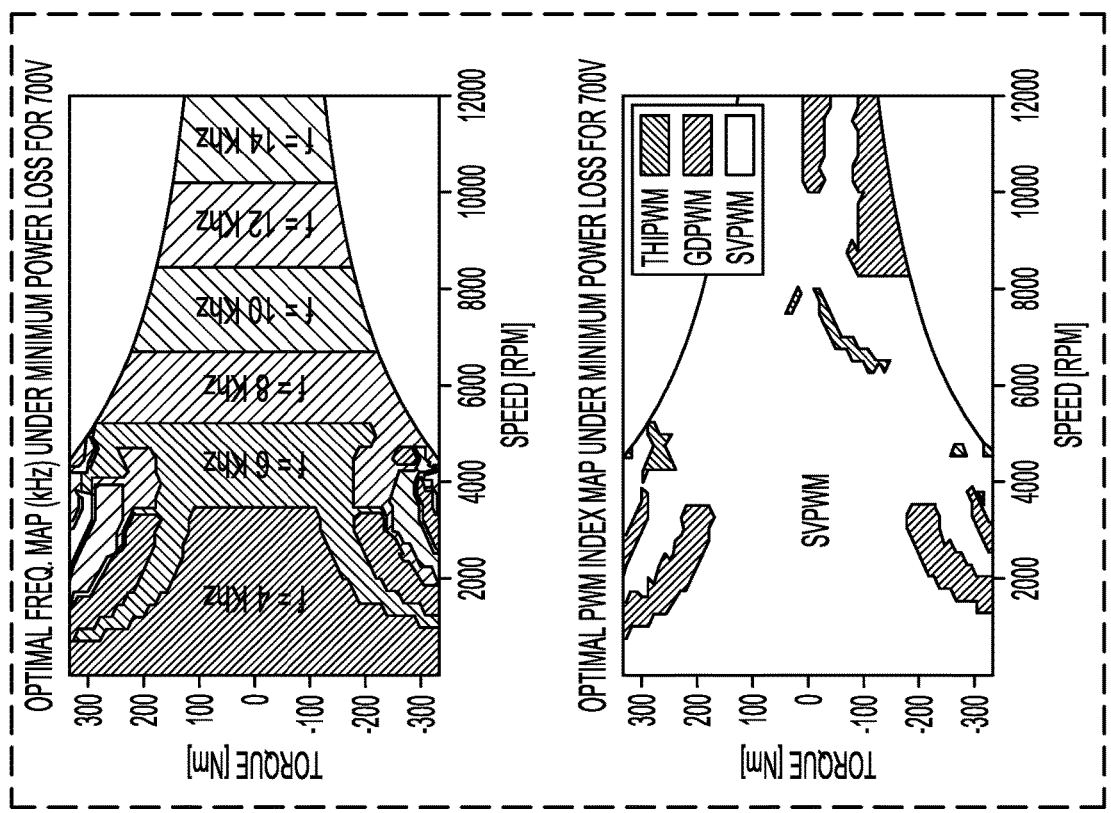
FIG. 9 is a graphical chart depicting an implementation of an optimal switching frequency and pulse width modulation (PWM) technique map used by the control system for controlling an electric machine.
Figure 8:
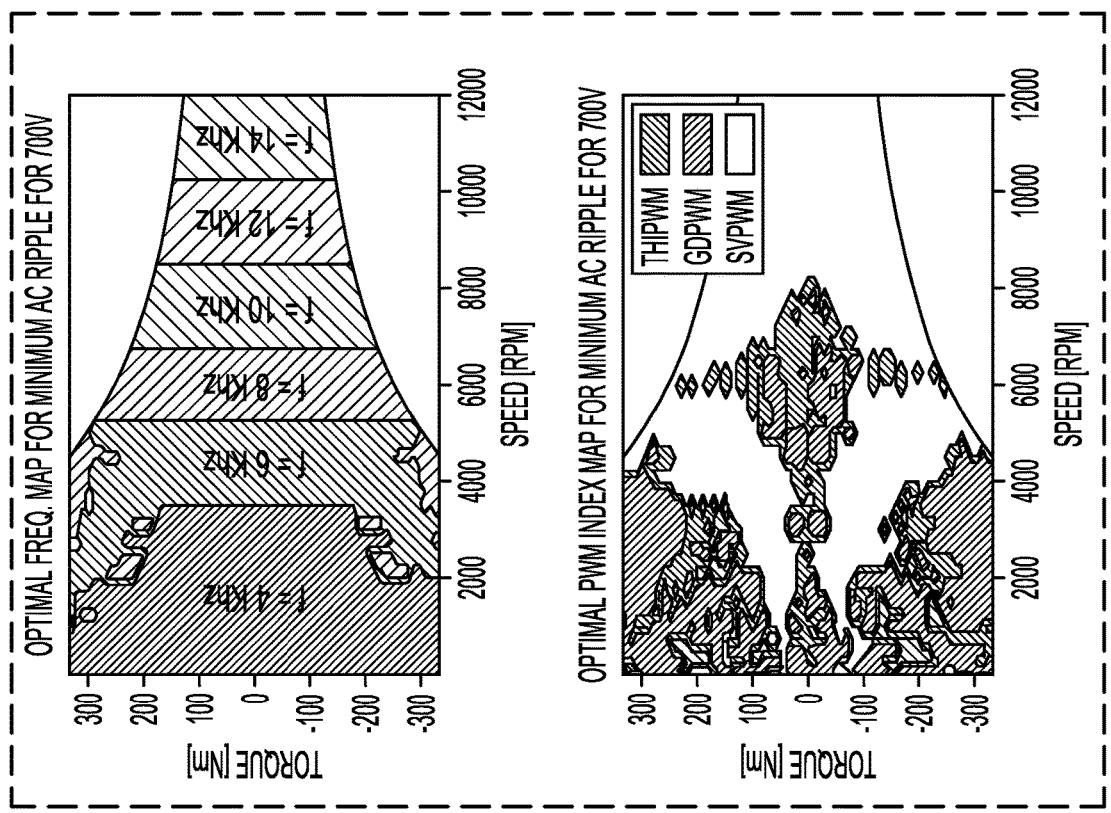
FIG. 8 is a graphical chart depicting an implementation of an optimal switching frequency and pulse width modulation (PWM) technique map used by the control system for controlling an electric machine.

FIG. 8 depicts a stored optimal switching map depicting the torque (T) and angular speed (ω) at which the control system 28 selects a switching frequency of 4 kHz, 6 kHz, 8 kHz, 10 kHz, 12 kHz, or 14 kHz and different PWM selection (SVPWM, GDPWM, or THIPWM) based on a minimized AC current ripple at DC voltage 700V. FIG. 9 depicts a stored optimal switching map depicting the torque (T) and angular speed (ω) at which the control system 28 selects a switching frequency of 4 kHz, 6 kHz, 8 kHz, 10 kHz, 12 kHz, or 14 kHz and different PWM selection (SVPWM, GDPWM, or THIPWM) based on a minimized power inverter power loss at DC voltage of 700V.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method of operating a power inverter for an electric machine, comprising the steps of:
    (a) selecting an inverter switching technique;
    (b) determining a frequency range for inverter switching;
    (c) determining a direct current (DC) voltage range for inverter switching;
    (d) determining a maximum efficiency at each torque-speed value along the torque-speed curve based on an alternating current (AC) ripple;
    (e) determining an optimal switching map including an inverter switching technique and frequency selection for each value of torque-speed on a torque-speed curve; and
    (f) controlling switches included in the inverter using the optimal switching map.

2. The method recited in claim 1, further comprising the step of determining a maximum inverter efficiency at each torque-speed value along the torque-speed curve based on inverter switching technique and switching frequency.

3. The method recited in claim 1, further comprising the steps of determining an inverter power loss at a torque-speed value along a torque speed curve and determining a maximum inverter efficiency at each torque-speed value along the torque-speed curve based on inverter switching technique and switching frequency.

4. The method recited in claim 1, further comprising the step of determining whether a selected pulse ratio is greater than a pulse ratio maximum.

5. The method recited in claim 1, wherein the frequency range is from 2 kHz to 16 kHz.

6. The method recited in claim 1, further comprising the step of receiving a performance selection or an efficiency selection.

7. The method recited in claim 1, further comprising the step of propelling or regeneratively braking an electric vehicle using the controlled switches.

8. A method of operating an inverter for an electric machine, comprising the steps of:
    (a) selecting an inverter switching technique;
    (b) determining a frequency range for inverter switching;
    (c) determining a direct current (DC) voltage range for inverter switching;
    (d) measuring performance of the electric machine at a selected inverter switching technique and a determined frequency range;
    (e) determining an inverter power loss at a torque-speed value along a torque speed curve;
    (f) determining a maximum efficiency at each torque-speed value along the torque-speed curve based on inverter switching technique and switching frequency;

(g) determining an optimal switching map including an inverter switching technique and frequency selection for each value of torque-speed on a torque-speed curve based on step (d); and (h) controlling switches included in the inverter using the optimal switching map.

9. The method recited in claim 8, further comprising the step of determining a maximum efficiency at each torque-speed value along the torque-speed curve based on inverter switching technique and switching frequency.

10. The method recited in claim 8, further comprising the step of determining a maximum efficiency at each torque-speed value along the torque-speed curve based on an alternating current (AC) ripple.

11. The method recited in claim 8, wherein the frequency range is from 2 kHz to 16 kHz.

12. A power inverter for controlling an electric machine, comprising:

a control system configured to select an inverter switching technique; determine a frequency range for power inverter switching; determine a direct current (DC) voltage range for power inverter switching; determine a maximum efficiency at each torque-speed value along the torque-speed curve based on an alternating current (AC) ripple; determine an optimal switching map including an inverter switching technique and frequency selection for each value of torque-speed on a torque-speed curve; and control switches included in the power inverter that are configured to electrically connect to the electric machine and the battery using the optimal switching map.

13. The power inverter recited in claim 12, wherein the power inverter is configured to measure performance of the electric machine at a selected inverter switching technique and a determined frequency range.

14. The power inverter recited in claim 12, wherein the power inverter is configured to determine a maximum efficiency at each torque-speed value along the torque-speed curve based on inverter switching technique and switching frequency.

15. The power inverter recited in claim 12, wherein the power inverter is configured to determine an inverter power loss at a torque-speed value along a torque speed curve and determine a maximum efficiency at each torque-speed value along the torque-speed curve based on inverter switching technique and switching frequency.

16. The power inverter recited in claim 12, wherein the power inverter is configured to determine a maximum efficiency at each torque-speed value along the torque-speed curve based on an alternating current (AC) ripple.

* * * * *